United States Patent [19]

Amlani et al.

[11] Patent Number: 4,567,377
[45] Date of Patent: Jan. 28, 1986

[54] MECHANICAL SWITCHING MEANS FOR PROVIDING SHUNT CALIBRATION IN A ROTARY TRANSFORMER SYSTEM

[75] Inventors: Kish Amlani; Sherif Gindy, both of Troy, Mich.

[73] Assignee: Eaton Corporation, Cleveland, Ohio

[21] Appl. No.: 444,839

[22] Filed: Nov. 26, 1982

[51] Int. Cl.[4] .................... G01L 3/00; H01H 9/00
[52] U.S. Cl. .................... 307/112; 73/862.35; 336/120
[58] Field of Search ............ 336/120, 123; 200/1 R, 200/8 R, 8 A, 11 R, 23, 24, 25; 307/112, 115, 145, 98, 102, 105; 73/862.32–862.35, 862.62, 862.64

[56] References Cited

U.S. PATENT DOCUMENTS

| | | | |
|---|---|---|---|
| 3,068,685 | 12/1962 | Rogers | 200/23 |
| 3,519,969 | 7/1970 | Hoffman | 336/120 |
| 3,790,811 | 2/1974 | Cooper et al. | 307/94 |
| 3,985,981 | 10/1976 | Weirick et al. | 200/25 |
| 4,059,005 | 11/1977 | Brendel et al. | 73/1 B |

FOREIGN PATENT DOCUMENTS 1071370 12/1959 Fed. Rep. of Germany ... 73/862.35

Primary Examiner—J. R. Scott
Attorney, Agent, or Firm—C. H. Grace; A. E. Chrow

[57] ABSTRACT

A system for calibrating a strain gage transducer mounted on a rotating member comprising a mechanical switch capable of making contact from a stator to selected terminals on the rotor to provide both positive and negative shunt calibration of the transducer. In a first embodiment, calibration is carried out while the rotor is stationary, providing a simple, cost effective calibration system for most applications. In a second embodiment, special terminals permit contact while the rotor is in motion. In a third embodiment, simultaneous calibration and gage measurements are possible while the rotor is in motion providing a means of continuous correction which is especially advantageous in applications where the rotor is subject to a rapidly changing environment.

11 Claims, 13 Drawing Figures

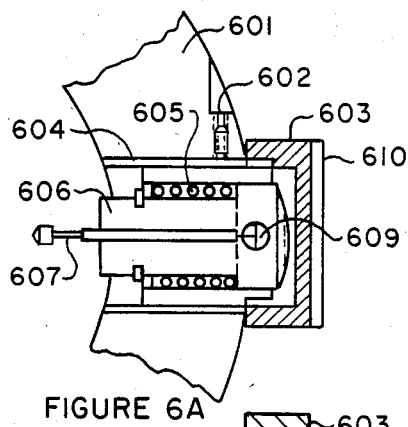
FIGURE 6A
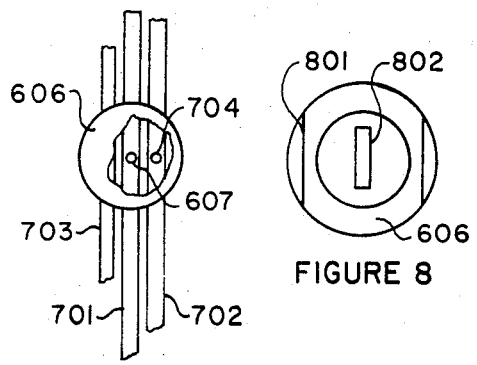
FIGURE 7
FIGURE 8
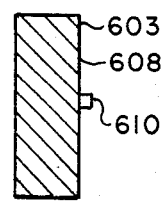
FIGURE 6B
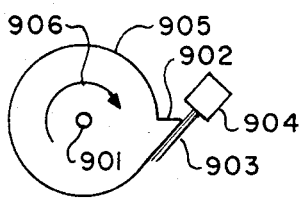
FIGURE 9
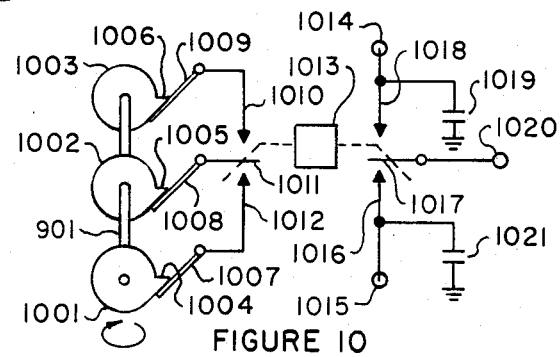
FIGURE 10
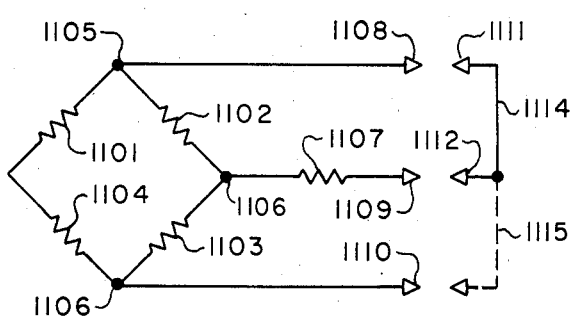
FIGURE 11
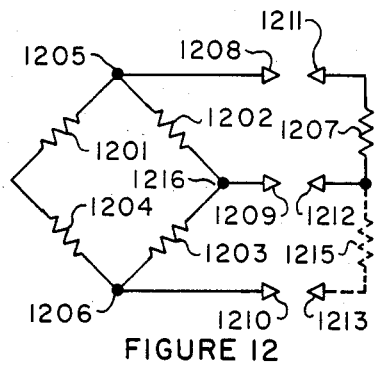
FIGURE 12

MECHANICAL SWITCHING MEANS FOR PROVIDING SHUNT CALIBRATION IN A ROTARY TRANSFORMER SYSTEM

BACKGROUND

1. Field

This invention relates to shunt calibration systems for transducers and, more particularly, to improvements in such systems in which rotary transformers are used to couple excitation and signal to and from a transducer mounted on a rotating member.

2. Prior Art

Rotating shaft torque transducers often utilize the maintenance advantages of rotary transformers for signal transfer. Rotating transformers differ from conventional transformers only in that either the primary or secondary winding is rotating. Such rotary transformers are generally described in U.S. Pat. No. 3,611,230 entitled "Rotary Transformer Structure". In applications where a strain gage transducer employing a Wheatstone bridge circuit is placed on a rotating member, a first rotary transformer is used only to transmit an AC bridge supply voltage to the bridge, while a second transformer is used to pick off the output voltage. Thus, through the use of the rotating transformers, slip rings are eliminated and there is no direct contact between the rotating and stationary elements of the sensor. Although this isolation is advantageous, it requires an external or dummy bridge, or a ground reference network, as disclosed in U.S. Pat. No. 3,790,811 to be used on the instrument side of the transformers. This circuitry provides a current return path for the AC carrier instruments generally used in transducer systems to properly monitor the output of the transducer.

A more complete understanding of rotary transformer systems as used in conjunction with transducers may be gained with the aid of FIGS. 1 and 2. Referring first to FIG. 2, a generalized transducer system is shown in which a carrier or source of alternating current 206 is coupled to the primary winding 208 of the first transformer 201. For ease of reference, this is referred to as the system excitation. The secondary winding 210 of the second transformer 204 couples the output voltage to an output or utilization device 207. This is referred to as the system signal. It must be appreciated at this time that a single "instrument" can provide the function of a carrier and a utilization device and in fact such instrument may be calibrated to provide an output reading of the property to be measured by the transducer system.

Referring to FIG. 1, a transducer system is illustrated for measuring the torque on a rotatable shaft 101. The excitation supply to the input of the system is coupled to the transducer on shaft 101 by a first transformer 102. Transformer 102 includes a stationary or primary winding receiving power from a connecting block 104 and a rotatable or secondary winding 105 connected to a strain gage transducer 106. Also shown is a second transformer 107 having a rotatable primary winding 110 coupled to the transducer and a stationary secondary winding 108 transmitting an output signal to the connecting block 104. Both the transformers and the transducer are contained within a housing 109.

When a rotary transformer system is utilized in conjunction with a strain gage bridge to measure the torque on the shaft, it is desirable to calibrate the bridge relative to the electrical instrumentation. Such calibration is necessary because of normal variations in the electrical equipment which provides the multiple functions of supplying the excitation to the bridge and which receives the output signal from the bridge. In addition, it is sometimes desirable to calibrate the equipment while the shaft is rotating.

To calibrate a strain gage bridge, a well known technique is to apply a resistor across one leg of the bridge. This technique is called shunt calibration because the resistor is connected in shunt or parallel across the bridge.

Prior to the present invention, calibration of the transducer in a rotary transformer system was very complex. The dummy bridge permitted a convenient method of performing a shunt calibration that is otherwise not possible on the shaft. This method of shunt calibration which is external to or removed from the rotating transducer, is in general, valid; however, it has certain limitations which restrict its use to controlled conditions which are difficult to obtain in actual practice.

Input impedance unbalance, found in some instruments, necessitates the use of a resistor-capacitor correction network with the dummy bridge. With an external shunt calibration system, the simulated shunt phase and the actual signal phase are frequency dependent and usually will not match. The shunt signal must be shifted to be in phase with the actual signal at the carrier drive frequency. This is accomplished by adjusting the values of the R-C network. The frequency sensitivity of this system limits its usefulness.

A prior art technique designed to overcome the disadvantages of the dummy bridge method of calibration is described in U.S. Pat. No. 4,059,005. In this technique, use is made of a magnetically actuated switch, mounted on the rotating shaft which is activated by introducing a magnetic field of sufficient strength. The switch, which is placed in series with a calibration resistor to connect it in parallel with an appropriate leg of the bridge, can be activated and used in static and dynamic conditions, regardless of shaft position by utilizing magnetically conductive rings.

The magnetically actuated switch technique uses many of the usual circuit components associated with measurements on rotating equipment. The circuitry of this technique will be dealt with in detail here because it provides a foundation for the present invention and it clearly shows the advantages of the present invention in eliminating the complication and cost of this prior art approach.

FIG. 3 illustrates a rotary transformer transducer system which is arranged to measure the torque of a rotatable shaft 308 and incorporates a magnetic switching system for calibration. The input signal is coupled to the shaft by a transformer 201 having a stationary winding 302, connected to block 301, and a rotatable winding 303 connected to a strain gage transducer 304 which incorporates a bridge. The output is taken from the bridge by a second transformer 204 having a rotatable winding 306 connected to the transducer and a stationary winding 305 connected to the connector block 301.

A schematic representation of this system is shown in FIG. 5 with the components on the left of the dash line being mounted on the rotating shaft 308 and the components to the right of the dash line being mounted in the stationary housing 307. Specifically, stationary winding 302 and 305, provide the system input and output respectively. These windings are secured within the housing 307 on the stationary side, while rotating windings 303 and 306 and the strain gage transducer 304 are all mounted on and rotate with the shaft 308. The strain gage transducer 304 is a bridge circuit which includes four legs 501 through 504.

The above described circuitry is common to most rotational torque measurement systems, however, it is the magnetically responsive switch that distinguishes this technique from other prior art approaches. In this embodiment, a shunt impedance 319, preferably a resistor, is selectively connectable across a first part of the strain gage bridge such as across leg 501 from a first terminal 505, defined as the junction of legs 501 and 504, through a magnetically responsive switch, such as a reed switch 309, and then to the common connection between legs 501 and 502 of the bridge. Upon closing switch 309 the impedance 319 is connected across leg 501. In order to actuate reed switch 309, an electromagnet 512 is provided having pole faces 511 and 516. Energization of magnet 512 closes switch 309 to couple the impedance 319 across leg 501, while de-energization of the magnet permits the reed switch contacts to open. Thus, reed switch 309 is a normally open type of hermetically sealed reed switch.

If a single reed switch 309 is secured to the rotatable shaft 308, when the reed switch is 180° away from the pole faces of the electromagnet, a stronger magnetic flux density is required to close the contacts of the reed switch than when switch 309 is adjacent the pole faces. Thus, the switch is position-sensitive, i.e., its distance away from the magnets may cause it to be free of influence from the magnetic field.

To eliminate position sensitivity and to minimize the effect of other variables such as shaft speed, shaft diameter, reed switch characteristics and magnet configuration, this prior art approaches uses three reed switches, 309, 309A and 309B, as illustrated in FIG. 4, each of which is electrically connected in parallel and supported by a ring assembly 310 and 312. The pole faces 511 and 516 of the magnet are positioned to oppose the steel rings. Thus, upon energization of the magnet 512, the steel rings concentrate the magnetic flux to assure that at least one reed switch closes.

The foregoing provides single shunt calibration i.e., positive or negative. However, if both positive and negative shunt calibration are desired, then the structure must include all the elements of FIG. 4. Specifically, ring 311 and switches 313, 313A and 313B. A second electromagnet 513 having pole faces 514 and 515 is provided as in FIG. 5 to actuate the second series of reed switches. This places the resistor 319 across leg 504 of the bridge.

The positive and negative shunt calibration method described above is preferred over the dummy bridge method because in the dummy bridge method both transformers are required to be perfect or their deficiencies must be compensated for this method to provide accurate results.

Although the reed switching method does permit direct application of the shunt calibration resistor to a transducer, the complication in realizing this advantage is quite significant. Multiple switches and magnetic rings are required. In addition, it has been found that on accelerating of the shaft to which the reed switches are mounted, unintentional closure of the switches occurs, resulting in erratic measurement results.

Slip rings are, in principle, simple devices that have long been used to make contact with rotating equipment. The main problem associated with slip rings is the continuous fricional wear. In addition, where power is applied, arcing occurs producing pitting which tends to produce a roughened surface, further increasing the fricional wear. These and other problems associated with slip rings have made the rotary transformer a preferred choice for instrument measurements. Unfortunately, the rotary transformer is costly and not always necessary, especially where a rotary measurement is not necessary or where it may only be required intermittently. For example, there is often no need to calibrate a transducer while the transducer is rotating. In such cases, systems employing rotary transformers for shunt calibration are excessively costly.

SUMMARY

It is an object of the present invention to provide a simple, low cost means for providing shunt calibration and the like for rotating equipment where such measurements may be made while the equipment is stationary.

It is an object of the present invention to provide a low cost means for providing both positive and negative shunt calibration for systems where such measurements may be made while the rotor is stationary.

It is an object of the present invention to provide low wear mechanical means for providing shunt calibration for rotating equipment while the equipment is rotating.

It is an object of the present invention to provide means for simultaneously calibrating and making a measurement using a transducer located on a rotating member.

A mechanical switch located on the stator side of a rotary transformer system contains two pins for contacting slip rings on the rotor side of the system. Three slip rings provide contact to two parts of a Wheatstone bridge for both positive and negative shunt calibration. In one embodiment the switch contains the shunt calibration resistor and is rotated to permit the inner pin located in the center of the switch to always contact the center slip ring, while the outer pin contacts either of the outer rings, depending on the position to which the switch is rotated. The switch is spring loaded allowing the operator to manually change its position by simply rotating it to the desired position. The keyway in the switch always insures proper alignment to make contact with the rings. When calibration is not required, the cover is screwed on to the switch body preventing any access to the switch.

A second embodiment entirely eliminates the rings, using only contacts on the rotary side which are aligned with the switch pins by rotation of the rotor.

A third embodiment places the shunt calibration resistor on the rotor to position it in the same environment as the bridge. The switch then is reduced in complexity requiring merely a short which connects the shunt resistor to the desired part of the bridge circuit.

BRIEF DESCRIPTION OF THE DRAWINGS

The various objects and advantages of the present invention will become more apparent upon reading the following detailed description of the invention taken in conjunction with the drawings. In the drawings, wherein like reference numerals identify corresponding components:

FIG. 6A is a cross sectional view of a preferred embodiment of the present invention, illustrating a pin contact and body retaining spring.

FIG. 6B is a view of the switch in direction Y illustrating the knurled surface used to aid in gripping the cover.

FIG. 7 is a plan breakaway view, illustrating the pins making contact with two of three slip rings.

FIG. 8 is a side view of the switch illustrating the slot used to align the switch in the positive and negative calibration positions.

FIG. 9 is a detail of an intermittent contact system for rotary equipment.

FIG. 10 is a system diagram using three intermittent contacts to permit simultaneous measurement and calibration for rotating transducer system.

FIG. 11 is a Wheatstone bridge showing the use of a short for calibration purposes.

FIG. 12 is a Wheatstone bridge showing a switched resistor used for shunt calibration.

DETAILED DESCRIPTION OF THE INVENTION

Figure 1:
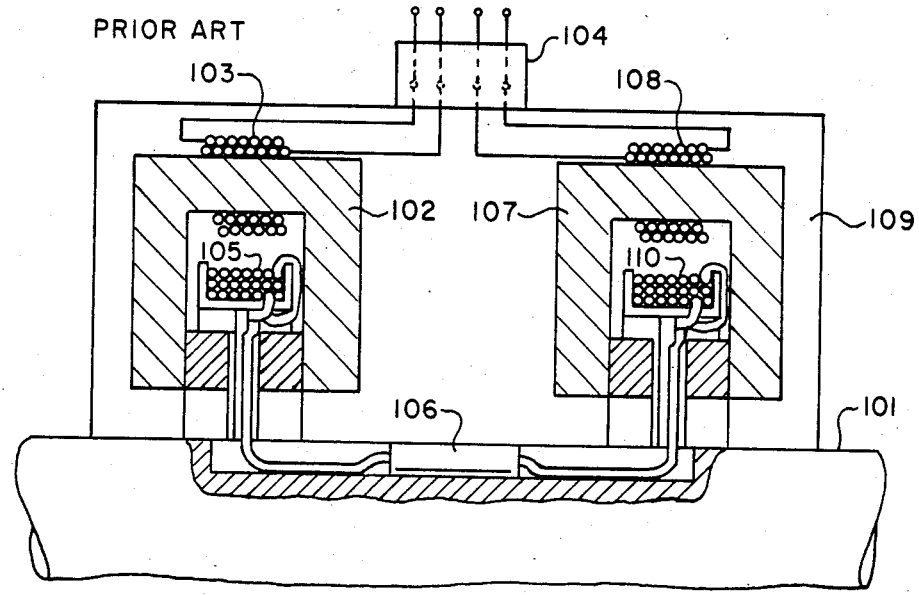
FIG. 1 is an illustration, partly in cross-section, of a prior-art transducer system wherein the invention may be employed.
Figure 2:
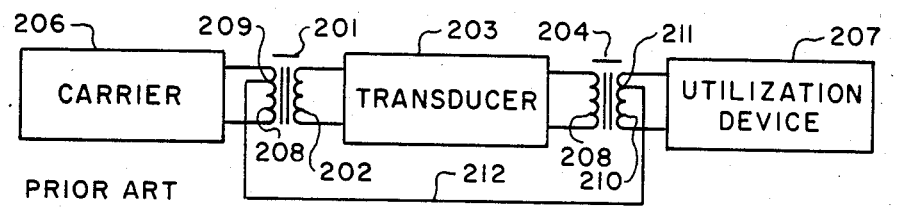
FIG. 2 is a schematic illustration of the fundamental operation of rotating transformers used in a prior-art rotating transducer system.
Figure 3:
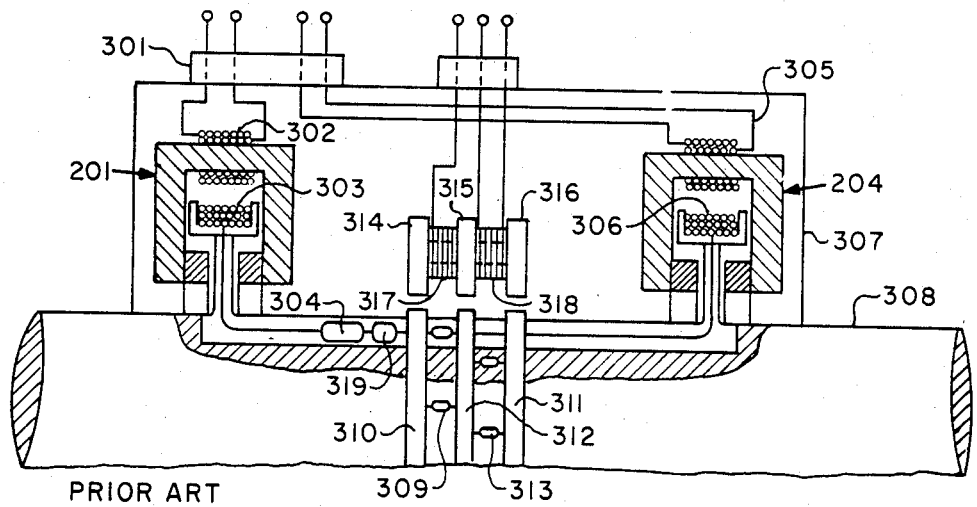
FIG. 3 is an illustration, partly in cross section, of a prior-art transducer system using rotating transformers for signal coupling and magnetic switches for shunt calibration.
Figure 4:
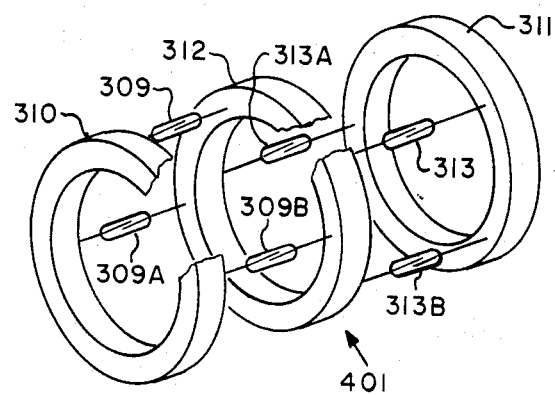
FIG. 4 is a perspective drawing of a magnetic switch and ring assembly for the prior-art system of FIG. 3.
Figure 5:
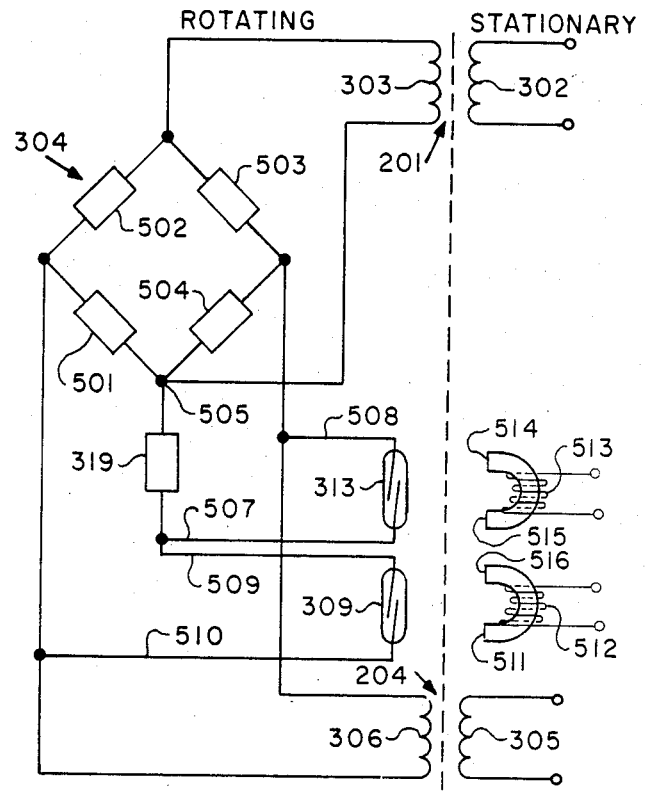
FIG. 5 is a schematic representation of a prior art calibration system using rotary transformers for signal coupling.

For a full understanding of the invention, reference will be made to one environment in which the invention has particular utility. The environment is a transducer system for measuring torque of a rotating member. It must be appreciated, however, that once the broad principles of the present invention are understood, the invention may be utilized in other environments.

It is possible for calibration purposes to eliminate the complexity of noncontacting prior art mechanisms, such as rotary transformers and magnetic switches which were designed to provide continuous coupling to a rotary member. It is also possible to eliminate the wear and other problems usually associated with contacting means such as slip rings. In accomplishing this, it is important to recognize that in many cases a Wheatstone bridge may be calibrated satisfactorily while the rotor is stationary, eliminating the need for slip rings entirely by replacing the rings with single position contacts. Such contacts may be designed to operate during rotation to provide calibration while normal transducer output is maintained, a significant advantage in a rapidly changing environment.

A preferred embodiment of the invention capable of providing these advantages is illustrated in FIGS. 6 through 8. FIG. 6 shows a cross sectional view of a switching device used to make contact with slip rings on the rotor for only as long as a calibration measurement is desired. This device comprise a stator member 601, a lock screw 602, a protective cover 603, a cavity in the stator member 604, a plunger 606, a spring 605, and a contact pin 607.

FIG. 7 is a side view of the switch with the stator removed showing pins 607 and 704 ready to make contact with slip rings 702 and 701. A third slip ring 703 is shown to the left, but this ring is not shown in a ready to contact position with any of the pins in this Figure.

FIG. 8 is a side view of the plunger assembly, with cover 603 removed showing a slot 802 used in aligning the plunger properly to make contact with either set of the slip rings (702 and 703 or 701 and 702). Flats, such as flat 801, may be used in conjunction with or in place of slot 802 for rotating number 606 if desired.

In the operation of the switch, the spring 605 forces the plunger 606 to the right in FIG. 6A keeping the pins 607 and 704 away from the slip rings. As shown in FIG. 7, the pin 607 is located centrally in the plunger and is ready to make contact with the center slip ring 702 when the plunger is pressed leftwise (in FIG. 6) against the spring while the outer pin 704 makes contact with one of the outer slip rings (701) putting the shunt calibration resistor across these two rings. In order to make contact with the other outer slip ring 703, the male key 610 in cover 603 is inserted in the slot in the plunger 606, rotated 180 degrees and then removed. A slight pressure on the plunger against the spring underneath will put the shunt calibration resistor across rings 702 and 703 which then may, if desired, be locked in the contacting position by means of lockscrew 602.

FIG. 11 shows a Wheatstone bridge and a means of calibrating the bridge using a switch which provides a short. The bridge in this Figure is comprised of resistors 1101 through 1104 arranged in a conventional bridge configuration One junction of the resistors 1106 is selected to make contact with the shunt calibration resistor 1107. Two other junctions 1105 and 1106 of the bridge are used to make contact with the opposite end of the resistor 1107 for the purposes of positive and negative shunt calibration. These points 1105 and 1106 are brought out to switch contacts 1108 and 1110 while the opposite side of the resistor 1107 is brought to switch contact 1109. A switch containing a short 1114 and having contact 1111 and 1112 may be placed across the contacts 1109 and 1108 and then alternately, as shown by dashed line 1115, placed across contacts 1109 and 1110.

It can be seen that the switch shown in FIGS. 6 through 8 may be used for the purpose of applying a short such as 1114 across the desired contacts by way of the slip rings. For example, contacts 1108, 1109 and 1110 correspond to the slip rings 701, 702 and 703 and pins 607 and 704 correspond to switch contacts 1111 and 1112. The element 609 in FIG. 6 becomes a short between pins 607 and 704 and corresponds to short 1114. Rotating the switch shown in FIG. 6 corresponds to alternating the position of the short from 1114 to the dashed position 1115 shown in FIG. 11.

FIG. 12 is virtually identical to FIG. 11 and similar components are numbered with the same last digits as was used in FIG. 11. The primary difference between FIGS. 11 and 12 is the transfer of the shunt calibration resistor from the Wheatstone bridge to the switch. Electrically there is no difference. Physically the only difference is converting element 609 from a short to a resistor. There is, however, a significant advantage in placing the shunt calibration resistor 1107 on the rotating member in close proximity to the resistive elements of the bridge. By so placing the calibration resistor, it experiences the same environment as the bridge resistors. Assuming the shunt calibration resistor has the same temperature coefficient as the bridge resistors, it can provide a more accurate calibration, despite changes in localized ambient temperature. The switch shown in FIGS. 6 through 8 is capable of providing either configuration by merely substituting a short or a resistor for element 609 in FIG. 6A.

In a number of instances it is not necessary to calibrate the system while the rotor is in motion. In such cases, the rotor need not have slip rings to make contact to the pins, but may instead have fixed, localized contacts which are brought into contact with the pins by rotating the rotor.

A number of possible alternative configurations within the scope of the invention are immediately apparent. Two of these alternatives are illustrated in FIGS. 9 and 10. FIG. 9 illustrates a rotor 905 which rotates in the direction shown by arrow 906 about shaft 901. Located on the periphery of the rotor 905 is a wedge shaped switch contact 902 which makes contact with a brush 903, held in brush holder 904. The wedge shaped contact prevents damage to the brush and contact 902 by virtue of the sloped surface which serves to slowly engage the brush on rotation. A pin type contact may be substituted for the brush type shown in which case the pin would be driven outward in a radial direction from the rotor axis during contact with 902.

FIG. 10 is a schematic diagram of a system utilizing three of the contacts shown in FIG. 9. This Figure comprises three ring shaped supports 1001 through 1003, for wedge switch contacts 1004 through 1006, designed to make contact with brushes 1007 through 1009. Brush contacts 1007 through 1009 are connected to switch contacts 1010 through 1012 with contacts 1011 forming the arm of the switch to make contact with the remaining contacts 1010 or 1012. Unit 1013 represents a drive mechanism for the arm 1011. Unit 1013 also serves to drive a second switch 1017 designed to contact points 1016 and 1018.

In the operation of this system the rotor shaft 1022 is rotated to position on which all the switch contacts 1004 through 1006 are aligned with brushes 1007 through 1009. Switch drive unit 1013 closes arm 1011 to make contact either with contact point 1010 or contact point 1012 providing a short circuit necessary to connect the shunt calibration resistor to the bridge.

It should be noted that the design of the switch contacts on the rotor in FIGS. 9 and 10 produce intermittent contact as the rotor revolves. This feature may be used to provide calibration of the system while obtaining normal measurements from the bridge. To achieve this dual function, the output signal data from the bridge is supplied to port 1020 as shown in FIG. 10. Port 1020 receives its signal from switch arm 1017. The drive mechanism 1013 alternately switches the arm between contact points 1016 and 1018 in accordance with the rotation of the rotor. The arm 1017 remains connected to contact point 1016 until contact is made with the contact points 1004 through 1006 by brushes 1007 through 1009. At the time contact is made, the switch arm 1017 is switched to contact point 1016 momentarily until the contact between the brushes and contact points 1004 to 1006 is broken. In this way, the output from port 1015, which is connected to contact point 1016, will provide the normal signal output from the bridge for a strain measurement while the output from port 1014, which is connected to contact point 1018, will provide the normal calibration data output. Capacitor 1019 is placed across port 1014 to ground and capacitor 1021 is placed across port 1015 to ground to integrate the output data and remove the pulsing effect due to the switching operation. By means of the circuit of FIG. 10, a continuous calibration data output can be taken, even though continuous measurement data is being taken simultaneously. This is particularly advantageous when there are rapid changes in the environments which would render erroneous separate calibration and separate strain measurement taken at different times and in different environments.

The intermittent contact may be obtained by slip rings which are insulated over all of their surfaces except for a small contact. The wear normally experienced by slip rings is avoided in the present invention by merely extracting the plunger and rotating it 90° to a position where the key will not be accepted by the keyway. The pins or brush type contacts are extracted and thereby removed from contact with the rings, except for the time period in which a measurement is to be made.

Having described our invention, we claim:

1. A switching system for calibration of a transducer positioned on a rotary member, said member being designed to rotate about an axis of rotation, and said switching system comprising:
  (a) a switch support means which is maintained in a stationary position with respect to the rotary member, the switch support means having a cylindrical port passing through the support means with axis of revolution of said port being positioned generally radially with respect to the axis of rotation of said rotor member,
  (b) a switch body means having a cylindrical shape which generally conforms to and fits within the cylindrical port in the support means with spacing therebetween for rotational and axial movement therein, said switch body means having a side which faces the rotating member,
  (c) a first switch contact means positioned on the switch body means on the side facing the rotating member, the first contact means being generally located on the axis of revolution of the switch body means,
  (d) a second switch contact means positioned on the switch body means on the side facing the rotating member, the second contact means being located away from the axis of revolution of the switch body means,
  (e) first rotary contact means positioned on the rotary member to make contact with the first switch contact means,
  (f) second rotary contact means positioned on thr rotary member to make contact with the second switch contact means in conjunction with a calibrating impedance means at a location not coincidental with the first rotary means,
  (g) third rotary contact means positioned on the rotary member to make contact with the second switch contact means at a location not coincidental with the first and second rotary contact means, the second switch contact means being moved with the switch body means to make contact with the second and third rotary contact means in conjunction with a calibrating impedance means by manual rotation of the switch body means within the cylindrical port in the support means,
  (h) resilient means connected between the switch support means and the switch body means urging the switch body means and the first and second switch contact means away from the first, second and third rotary contact means; and (i) said switch body member adapted to be manually urged against the resilient means axially within the cylindrical port and cause the first and second switch contact means to respectively contact the first and second rotary contact means at a first rotational postion of the body member means and cause the first switch contact means to contact the first rotary contact means and the second switch contact means to contact the third rotary contact means at a second rotational position of the body member means.

2. The switching means as defined in claim 1 further comprising a switch cover having a key and a keyway means between the switch body means and the cover for rotating the switch body means between the first and second rotational positions.

3. Apparatus as claimed in claim 1, wherein the switching means further includes shorting means connected between the first and second switch contacts in the switch body means and the impedance means is mounted on the rotary member and connected to the transducer.

4. Apparatus as claimed in claim 1, wherein said impedance means is connected between the first and second switch contact means.

5. A system for simultaneously calibrating and monitoring a signal output of a transducer mounted in a rotary member while the rotary member is rotating, comprising:

(a) support means which is maintained in a stationary position with respect to the rotary member, (b) first, second, third and fourth stationary terminals mounted on the support means, (c) first intermittent rotary contact means mounted on the rotary member for making intermittent connection between the first stationary terminal and a first calibration point on the transducer in conjunction with a calibrating impedance means, (d) second intermittent rotary contact means mounted on the rotary member for making intermittent connection between the second stationary terminal and a second calibration point on the transducer in conjunction with a calibrating impedance means, and (e) switching means for switching the signal output of the transducer between the third and fourth stationary terminals, and switch driving means for driving the switching means from the third to the fourth stationary terminal only when intermittent contact is made to the first and second rotary contact means, the signal output for monitoring being supplied from the third stationary terminal and the single output for calibration being supplied from the fourth stationary terminal.

6. A system as defined in claim 5, wherein said impedance means is a resistor.

7. A system as claim in claim 5, further comprising:
(a) a fifth stationary terminal mounted on the support means,
(b) a third rotary contact means mounted on the rotary member for making connection between the second calibration point on the transducer and the fifth stationary terminal, and
(c) means for transferring the impedance means from a connection between the first and second stationary terminals to a connection between the second and fifth stationary terminals.

8. The system of claim 5 wherein the calibrating impedance means is mounted on the rotary member and connected to the transducer.

9. The system of claim 5 wherein the calibrating impedance means is mounted on the support means.

10. The system of claim 1 including locking means for locking the first and second switch contact means in respective contact with the first and second rotary contact means when the body member is in the first rotational position and for locking the first and second switch contact means in respective contact with the first and third rotary contact means when the body member is in the second rotational position.

11. The system of claim 1 wherein the impedance means is a resistor.

* * * * *